(No Model.)
A. J. LYTLE.
SHEEP SHEARS.
No. 340,053. Patented Apr. 13, 1886.
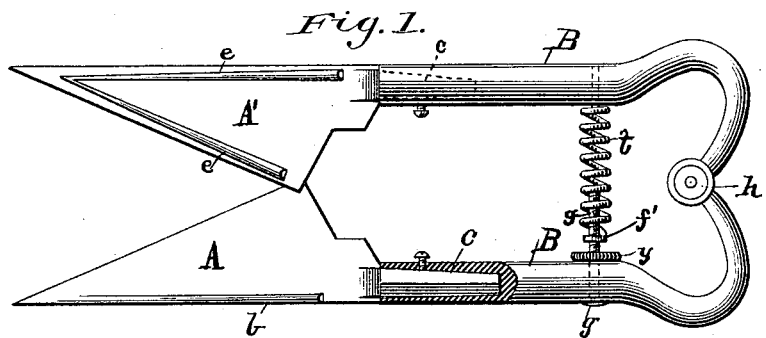
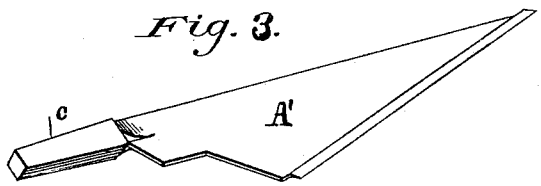
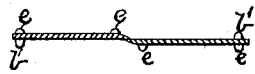
Witnesses:
H. R. Quinn
J. W. Quinn
Andrew Jackson Lytle, Inventor.
by T. H. Alexander, Attorney

UNITED STATES PATENT OFFICE.

ANDREW JACKSON LYTLE, OF HILLSBOROUGH, OHIO, ASSIGNOR TO O. S. PRICE AND S. P. SCOTT, BOTH OF SAME PLACE.

SHEEP-SHEARS.

SPECIFICATION forming part of Letters Patent No. 340,053, dated April 13, 1886.

Application filed July 31, 1884. Renewed October 15, 1885. Serial No. 180,013. (No model.)

*To all whom it may concern:*

Be it known that I, ANDREW JACKSON LYTLE, a citizen of the United States, residing at Hillsborough, in the county of Highland and State of Ohio, have invented certain new and useful Improvements in Sheep-Shears; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, in which—

Figure 1 is a plan view of my improved sheep-shears, partly in section. Fig. 2 is a cross-section through the two blades. Fig. 3 is a perspective view showing a modification of one of the blades of Figs. 1 and 2.

This invention relates to improvements in sheep-shears; and it consists in the novel construction of the same hereinafter described, and particularly pointed out in the appended claim.

A A' designate the angular blades of the shears, which are constructed with tapered shanks $c\ c$, fitted into corresponding sockets in the ends of the shear-arms B B, and held therein by means of set-screws. The blades can thus be readily removed at pleasure for sharpening them. The bottom blade, A', is constructed with longitudinal ribs $e\ e$ on its bottom side and a longitudinal rib, $b$, located along its back edge on its upper side, which ribs are tapered to the point of the blade. The upper blade, A, is constructed with two ribs, $e\ e$, on its bottom side, and a rib, $b'$, on its upper side, one of which is located along its cutting-edge, and the other two are located along its back, both ribs $e\ e$ converging to a point and being tapered, as shown in Fig. 1. The ribs $b\ b'\ e\ e$ not only stiffen the blades and admit of their being made of very thin steel, but they also prevent the back surfaces of the blades from contact with the skin or pelt of the animal during the shearing operation. These ribs may be formed by swaging, and they may be made as shown in Fig. 3, or by curving the blade, as shown in Fig. 2. The rear ends of the handles B B are curved, as shown, and united by a suitable joint, $h$. In front of this joint $h$, and rigidly secured to one of the arms B of the shears, is rigidly fixed a pin, $g$, which is screw-threaded, and on which is applied an adjustable thumb-nut, $y$. To the opposite arm, B, is fixed a coiled spring, $f$, which receives in one end the said screw-pin $g$, and is attached to a collar, $f'$, loosely applied on this pin. By adjusting the thumb-nut $y$ the tension of the spring can be regulated.

I am aware that it is not broadly new to re-enforce sheep-shear blades by forming ribs on them, which ribs prevent the blades from cutting the animal while shearing it. I am also aware that it is not broadly new to apply a tension-screw to a bow-spring used for opening the shears, and therefore I disclaim such devices.

Having described my invention, I claim—

Sheep-shears having blades constructed with guarding and re-enforcing ribs and tapered shanks, shear arms bowed and jointed at their rear ends, a coiled spreading-spring, a screw-threaded guide-pin, a sliding collar, and an adjustable thumb-screw thereon, all constructed and adapted to operate substantially as and for the purposes described.

In testimony whereof I affix my signature in presence of two witnesses.

ANDREW JACKSON LYTLE.

Witnesses:
W. T. GREUBER,
GEO. W. LEFEVRE.